Sept. 19, 1961     S. T. SHEARS     3,000,069
FASTENING DEVICE
Filed Jan. 9, 1959
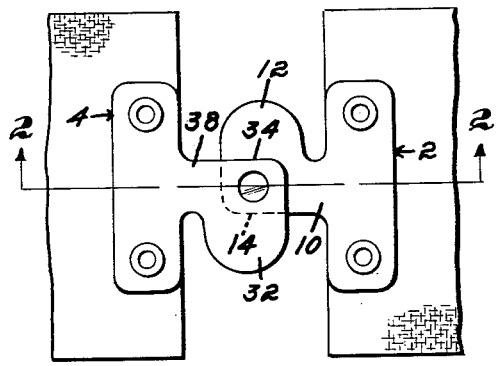
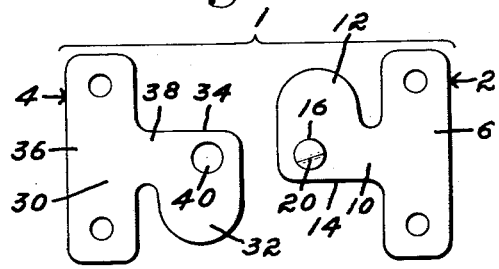
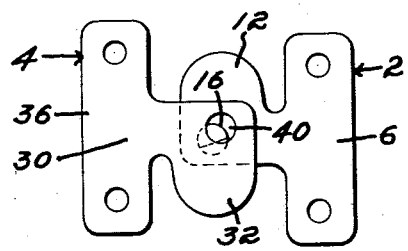
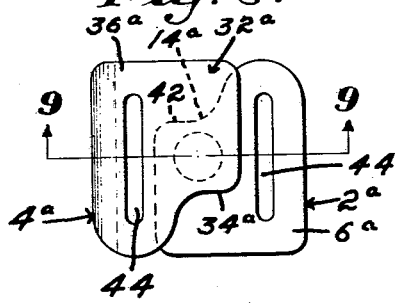
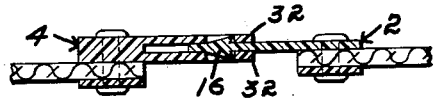
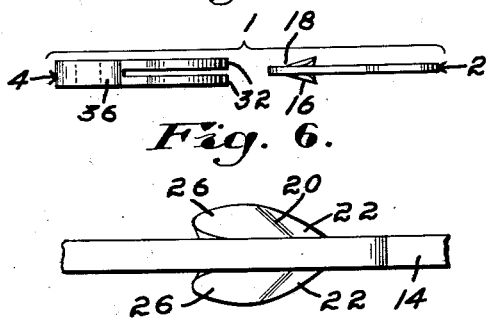
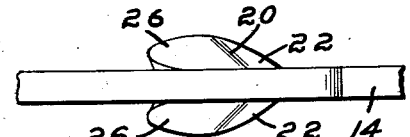
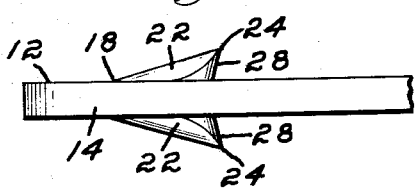
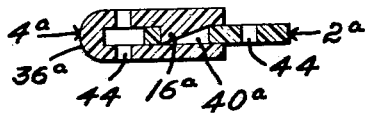
Inventor:
Stuart T. Shears.
by Walter S. Jones
Atty.

United States Patent Office 3,000,069
Patented Sept. 19, 1961

3,000,069
FASTENING DEVICE
Stuart T. Shears, Belmont, Mass., assignor to United-Carr Fastener Corporation, Cambridge, Mass., a corporation of Delaware
Filed Jan. 9, 1959, Ser. No. 785,813
1 Claim. (Cl. 24—230)

This invention relates generally to separable fasteners and has particular reference to fasteners which are engaged by forces which act at a substantially right angle to forces used to disengage said fastener.

An object of the invention is to provide a fastener which can be disengaged by opposing pressure of the fingers or a plier like tool.

A further object of the invention is to provide a fastener whose male member has a stud biased in two different directions for easy engagement and disengagement with an apertured female member.

Other objects of the invention will, in part, be obvious, and will, in part, appear hereinafter.

In the drawing:

FIG. 1 is a top plan view of the assembled fastener attached to a fabric;

FIG. 2 is a section taken on the line 2—2 of FIG. 1;

FIG. 3 is a top plan view of the separate elements of the fastener;

FIG. 4 is a side elevation of the separate elements of fastener;

FIG. 5 is a top plan view of the elements of the fastener partly engaged;

FIG. 6 is a front elevation of the studs enlarged;

FIG. 7 is a side elevation of the studs enlarged;

FIG. 8 is a top plan view of a variation of the fastener, the elements completely engaged; and FIG. 9 is a section taken on the line 9—9 of FIG. 8.

Referring to the drawing, there is illustrated a separable fastener 1 which could be used as a closure on different types of garments, as for example, a brassiere or a sweater. The fastener 1 comprises two elements, a male element 2 and a female element 4. The male element 2 comprises a base portion 6 which, in the preferred embodiment, has the form of a rectangle although almost any geometric form would operate satisfactorily. The base portion 6 is in integral right angle relationship with a connecting portion 10 which is also substantially rectangular in form as shown in FIG. 3. On the opposite side of the connecting portion 10, from the base portion 6 and integral therewith, is a solid arcuate engaging portion 12 as shown in FIGS. 1, 3 and 5. The engaging portion 12 has a leading edge 14 which is a continuation of an edge of the connecting portion 10. A stud 16 is formed a predetermined distance from the leading edge 14 on each side of the engaging portion 12 as shown in FIGS. 6 and 7. The said studs 16 have a common axis which runs through the engaging portion 12. The edge of the stud 16 farthest from the base 6 is the engaging edge 18 and a chord 20 is marked on the stud 16 dividing the stud into two planar segments of a circle. The planar segment of a circle closest to the leading edge 14 of the engaging portion 12 is termed the release portion 22 of the stud 16. The release portion 22 is biased in that it has its lowest point on the chord 20, almost equal to the plane of the engaging portion 12 at the engaging edge 18 and its high point 24 at the point farthest from the plane of the engaging portion on the chord 20 and farthest from the engaging edge 18. The bias of the release portion 22 is from the chord 20 toward the plane of the engaging portion 12, and from the high point 24 toward the plane of the engaging portion as shown in FIG. 7. The other planar segment of a circle is termed the trailing portion 26. The trailing portion 26 is biased in an opposite direction from the chord 20 from that of the release portion 22 and in the same direction as the release portion 22 from the high point 24. In effect, the stud 16 and the plane of the engaging portion 12 form two triangles, one of which has its apex along the chord 20 and the other substantially a right angle triangle with its apex at the opposite end of the chord 20 from the high point 24. The edge of the stud 16 formed between the plane of the engaging portion 16 and the high point 24 may be termed a holding edge 28.

The female element 4 is formed of an end portion 30 substantially rectangular in shape, a pair of wing portions 32 of the same geometric shape as the engaging portion 12 and the connecting portion 10 in spaced parallel relationship with each other. The engaging edges 34 of the wing portions 32 form a pair of straight parallel edges integral with a female base portion 36 which also connects the terminal ends 38 of the wing portions 32 as shown in FIG. 4. The female base portion 36 may be of any convenient geometric shape. In the preferred embodiment a rectangular form has been used as shown in FIG. 3. Apertures 40 are formed in each of the wings 32 a predetermined distance from the engaging edge 34 and the female base portion 36. The diameter of said apertures 40 is slightly larger than the diameters of the studs 16. To engage the male element 2 with the female element 4, the wings 32 are placed on opposite sides of the engaging portion 12 with the leading edge 14 of the engaging portion 12 lying between the wings 32. At this juncture, the axes of the aperture 40 are in spaced parallel relationship with the axes of the studs 16. If opposing pressure is now applied on the arcuate edge of the engaging portion 12 and the arcuate edges of the wings 32, the engaging edges 34 of the wings 32 will be cammed away from each other as they pass over the surface of the biased release portions 22 of the studs 16. This camming action continues until the studs 16 are circumscribed by the walls of the apertures 40. At which time the male element 2 and the female element 4 is engaged with the holding edges 28 bearing against a portion of the walls of the aperture 40. The two elements may also be engaged by passing the engaging edge 18 of the stud 16 between the wings 32 in substantially the position shown in FIG. 3. In this case the camming action is caused by the bias of the studs 16 running from the engaging edge 18 up the chord 20 to the high point of the stud 24. To disengage the two elements of the fastener, the opposing pressures exerted on the arcuate edges of the wings 32 and the engaging portion 12 mentioned heretofore is continued and the biased released portions 22 of the studs 16 will cam the wings 32 away from each other to release the two elements of the fastener from each other. As mentioned heretofore, the fastener may be used to hold any separated pieces of fabric or other required material together where it is not required that the pieces should overlap each other. The chief advantages of the fastener are:

(1) The easy and speedy way with which it can be engaged and disengaged.
(2) Its positive resistance to separating forces applied to pull the fastener apart when it is engaged.

FIGS. 8 and 9 disclose another embodiment of applicant's invention. This particular species of the invention embodies a male element 2a and a female element 4a. The male element 2a comprises a base 6a generally rectangular in form having a leading edge 14a, said leading edge 14a forming a cyma recta with a contact portion 42. An aperture 40a is formed a predetermined distance from said leading edge 14a through the base 6a. The aperture 40a is similar in form to the apertures 40 described hereinbefore. Slots 44 may be provided in the base 6a so that a strap can be fastened to said male element 2a. The female element 4a comprises a female base portion 36a in integral right angle relationship with a pair of wing portions 32a, said wing portions are in spaced parallel relationship with each other. The engaging edge 34a of each of the said wings 32a is in the form of a cyma recta as shown in FIG. 8. A stud 16a is formed in one of the said wings 32a a predetermined distance from the said engaging edge 34a, the stud 16a projects into the area formed between the said wings 32a. It is possible for a pair of studs to be formed on each of the wings 32a projecting into the area bounded by said wings 32a if it is necessary or desirable. Slots may also be formed in said wings 32a to accept a strap if desired or the wings could be constructed to accommodate almost any fastening means now available in the art for fastening the element to a fabric. In fact, both the male and female elements could be manufactured of a material which would allow dielectric heat sealing of the elements to a proper fabric. The mechanism of engaging the male element 2a and the female 4a is the same as that described for engaging the elements of the preferred embodiment.

Since certain other obvious modifications may be made in this device without departing from the scope of the invention, it is intended that all matter contained herein be interpreted in an illustration and not in a limiting sense.

I claim:

A fastener having a female member and a male member, said female member comprising two connected yieldable arms in spaced parallel relationship, one of said arms having a wall forming an aperture therethrough and said male member comprising an engaging portion and a stud extending from one face of said engaging portion, said stud having a holding edge in substantially right angle relationship with said engaging portion, said stud being circular in cross section and having its free end formed of two planar segments of a circle and having a common chord offset from the center of the circle, said chord sloping downwardly from said holding edge to merge into said engaging portion at a point offset from the axis of said engaging portion passing through the center of the stud, said segments forming an angle therebetween and each segment sloping downwardly from the chord and toward said engaging portion, said holding edge engaging the wall of said aperture to lock said female element to said male element and the smaller of said segments comprising a release portion to facilitate releasing of said stud from said aperture by a movement transversely of the axis of said engaging portion.

References Cited in the file of this patent

UNITED STATES PATENTS

| 669,931 | Loudermilch | Mar. 12, 1901 |
| 1,499,428 | Wagner | July 1, 1924 |
| 2,628,855 | Cushman | Feb. 17, 1953 |
| 2,900,696 | Bacon | Aug. 25, 1959 |

FOREIGN PATENTS

| 730,372 | France | May 10, 1932 |